No. 690,152. Patented Dec. 31, 1901.
N. S. JENKINS.
PORTABLE MELTING APPARATUS.
(Application filed Mar. 18, 1901.)
(No Model.)

UNITED STATES PATENT OFFICE.

NEWELL SILL JENKINS, OF DRESDEN, GERMANY.

PORTABLE MELTING APPARATUS.

SPECIFICATION forming part of Letters Patent No. 690,152, dated December 31, 1901.

Application filed March 18, 1901. Serial No. 51,614. (No model.)

*To all whom it may concern:*

Be it known that I, NEWELL SILL JENKINS, a citizen of the United States, and a resident of Dresden, in the Kingdom of Saxony, German Empire, have invented a new and useful Improvement in Portable Melting Apparatus, of which the following is a specification.

In my United States Patent No. 585,442, of June 29, 1897, I have described a portable melting apparatus for the use of dentists in fusing material—such as porcelain, enamel, and the like—for filling cavities in teeth or for melting enamel upon artificial teeth, platinum, or gold plate, and for other like purposes, and in my United States Patent No. 653,007, of July 3, 1900, I have described certain improvements in the said melting apparatus, which improvements consisted, mainly, in a device for regulating and controlling the admission of gas. In the two patents cited the apparatus has been described as heated by gas, such as ordinary gas for lighting and heating purposes; but in some instances it may be convenient or become necessary to heat the apparatus by some other material; and it is the main object of the present improvements to provide means for working or heating the apparatus by such other material. For this purpose the apparatus is provided with a closed vessel for receiving a fluid, such as alcohol, to be vaporized, the vessel being exposed to a flame for the said vaporization. From the said vessel a pipe is led to a burner in order to conduct the volatilized vapors from said vessel to the burner, which has two orifices—a central one for the issue of air, preferably in a compressed state, and a ring-shaped one, surrounding the central opening, for the issue of the volatilized alcohol. The air and the alcohol vapors will mix and if ignited will burn with a pointed flame to heat the muffle and its contents. As the vaporized alcohol will partly condense in the burner, I provide the latter with a pipe to conduct the products of condensation into a separate vessel for their collection and their reuse in the lamp underneath the vaporizing vessel or generator.

Figure 1:
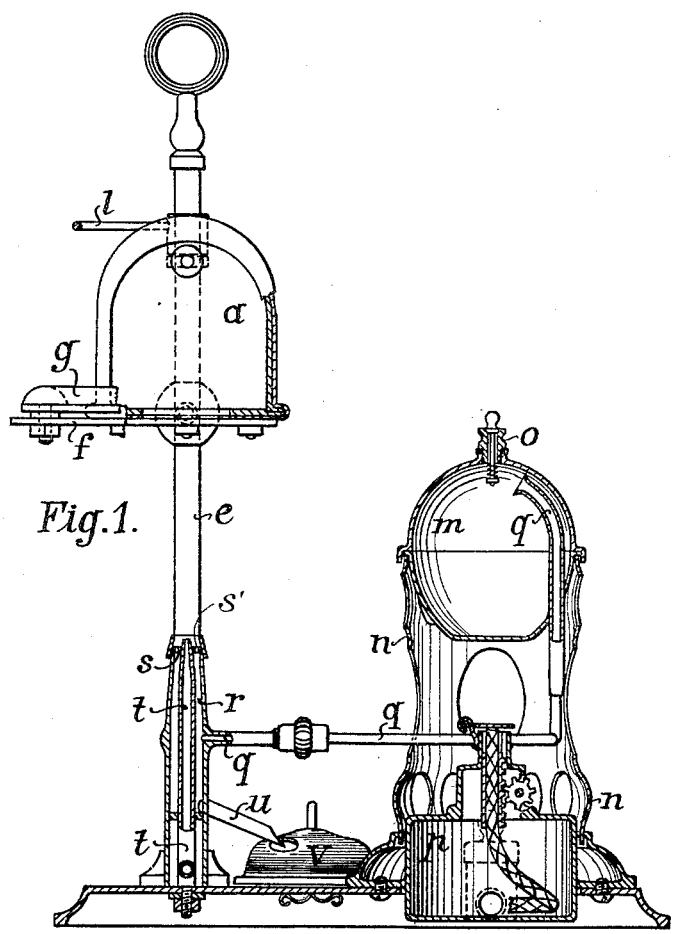
Figure 2:
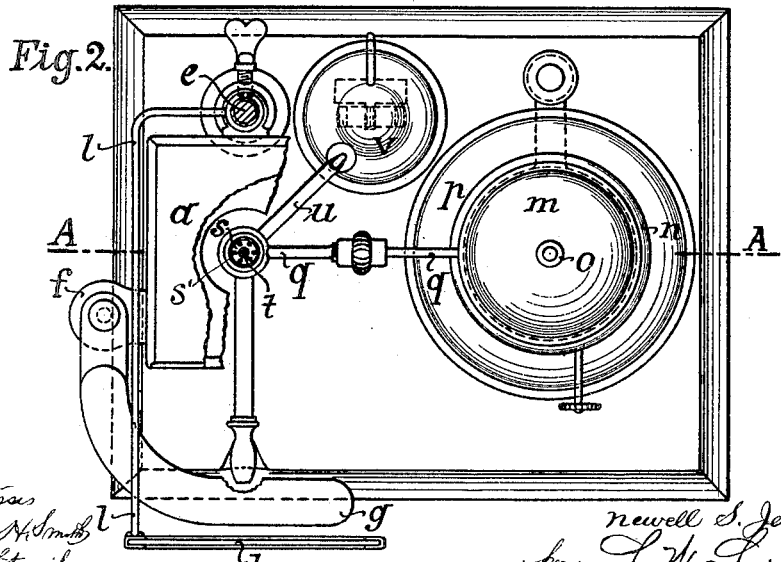

In the drawings, Figure 1 is a sectional view of the apparatus on line A A, Fig. 2; and Fig. 2 is a plan view with parts broken away.

$a$ is the small muffle, open in front and provided with a hole in its bottom and carried by a rod $e$. From a suitable base-plate the arm $f$ on muffle $a$ is provided with a carrier $g$ for supporting the handle of a melting-ladle (not shown in the drawings) to be placed in the muffle $a$. An arm $l$ carries a small glass screen $h$ for protecting the operator from the heat of the muffle.

All the aforesaid parts have become well known by my United States patents hereinbefore referred to and therefore form no part of the present invention.

For heating the apparatus by a flame produced from burning vaporized alcohol or the like substances the vessel $m$ is supported in a suitable frame $n$, said vessel having a supply-aperture closed by a screw-plug $o$, which plug is constituted so as to act as a safety-valve against overpressure in the vessel $m$. Underneath the vessel an alcohol-lamp $p$ is provided for heating the same, and the hot vapors pass off through pipe $q$ into the cylindrical part $r$ of the burner. The central pipe $t$ protrudes appreciably through the top $s$ of the cylindrical part $r$, surrounding the annular chamber. The bore of the pipe $t$ is considerably reduced at the upper end, so that the orifice at this end through which compressed air from a foot-bellows or other source is passed is quite small. The top $s$ of the cylindrical part is provided with a series of perforations $s'$, through which the vaporized alcohol passes and this part is advantageously surrounded with a sleeve or nozzle.

The vapors from the vessel $m$ and the compressed air from the central pipe commingle and if ignited burn as a pointed flame to heat the muffle $a$ and the melting-ladle placed in it. The pipe from vessel $m$ to the burner is preferably made in two parts united by thread and nut for disengaging the vessel $m$ and also for opening the pipe for cleaning purposes.

As the hot vapors enter the annular recess in the part $r$ of the burner they will be partly condensed. A pipe $u$ is arranged from this part for carrying away the products of condensation into a separate vessel $v$, arranged in the tray of the apparatus. This vessel $v$ is removable, so that it may be periodically emptied into the reservoir of the lamp $p$ and so to use this part of the alcohol for heating purposes.

My new construction of portable melting apparatus will be found to be very convenient and very successful in all cases in which the ordinary gas for lighting and heating purposes is not available.

I claim as my invention—

In a portable melting apparatus, the combination with a muffle having an open front and a hole in the bottom, a base-plate and support therefrom for the muffle, of a generator of hydrocarbon vapors, a burner beneath the hole in the said muffle having a central pipe for the passage of compressed air and an annular chamber for the reception of the said vapors, the said air-pipe extending beyond the end of the said chamber, which latter is provided with perforations for the escape of the said vapors at which points the said vapors burn, a reservoir for collecting the condensed vapor, a pipe leading from the bottom of the said annular chamber to the said reservoir for collecting the condensed vapor, and a screen of glass adapted to be interposed between the said burner and the operator, substantially as and for the purposes set forth.

In testimony that I claim the foregoing as my invention I have signed my name, in presence of two witnesses, this 28th day of February, 1901.

NEWELL SILL JENKINS.

Witnesses:
HERNANDO DE SOTO,
E. ROTH.